United States Patent
Park et al.

(10) Patent No.: US 7,787,584 B2
(45) Date of Patent: Aug. 31, 2010

(54) DEBRIS FILTERING BOTTOM SPACER GRID WITH LOUVERS FOR PREVENTING UPLIFT OF FUEL RODS

(75) Inventors: Joon-Kyoo Park, Yuseong-gu (KR); Kyong-Bo Eom, Yuseong-gu (KR); Kyu-Tae Kim, Yuseong-gu (KR); Jung-Min Suh, Yuseong-gu (KR); Nam-Gyu Park, Yuseong-gu (KR); Jin-Sun Kim, Seo-gu (KR); Dong-Geun Ha, Yuseong-gu (KR); Kyoung-Joo Kim, Yuseong-gu (KR); Jin-Seok Lee, Yuseong-gu (KR); Seong-Ki Lee, Yuseong-gu (KR); Kyeong-Lak Jeon, Seo-gu (KR)

(73) Assignee: Korea Nuclear Fuel Co., Ltd, Daejeon (KR)

( * ) Notice: Subject to any disclaimer, the term of this patent is extended or adjusted under 35 U.S.C. 154(b) by 0 days.

(21) Appl. No.: 12/434,960

(22) Filed: May 4, 2009

(65) Prior Publication Data

US 2010/0166135 A1    Jul. 1, 2010

(30) Foreign Application Priority Data

Dec. 26, 2008    (KR) .................... 10-2008-0134520

(51) Int. Cl.
*G21C 3/34*    (2006.01)
(52) U.S. Cl. ..................... 376/441; 376/438; 376/434
(58) Field of Classification Search ................ 376/352, 376/438, 441, 462, 434
See application file for complete search history.

(56) References Cited

U.S. PATENT DOCUMENTS

| 4,781,884 | A | * | 11/1988 | Anthony | 376/352 |
| 5,299,246 | A | * | 3/1994 | Bryan | 376/462 |
| 5,488,644 | A | * | 1/1996 | Johansson | 376/441 |

* cited by examiner

*Primary Examiner*—Rick Palabrica
(74) *Attorney, Agent, or Firm*—Sherr & Vaughn, PLLC (57) ABSTRACT

Disclosed are a bottom spacer grid with a louver on a spring that can filter debris flowed through a channel of a lower end fitting with coolant on the lower end fitting of a nuclear fuel assembly, and can prevent uplift of fuel rods due to coolant, simultaneously.

The bottom spacer grid for debris filtering with the louver for preventing uplift of the fuel rods, in the spacer grid equipped with a strip dividing a plurality of unit grid cells and a plurality of springs, protruded in uniform directions of each of vertical and horizontal directions on a grid surface of the strip, having uniform elasticity and supporting a lower end cap of a nuclear fuel rod, which includes: a spring having a plane portion with a predetermined size to contact to an outer circumference of the bottom end cap of the nuclear fuel rod; a louver protruded downward the spacer grid at a predetermined angle from the plane portion of the spring; and a debris filtering member bent and protruded to the bottom of the grid surface of the spacer grid.

5 Claims, 10 Drawing Sheets

DEBRIS FILTERING BOTTOM SPACER GRID WITH LOUVERS FOR PREVENTING UPLIFT OF FUEL RODS

CROSS-REFERENCE TO RELATED APPLICATION

This application claims priority to Korean Patent Application No. 10-2008-0134520 filed on Dec. 26, 2008 which is hereby incorporated by reference in its entirety.

BACKGROUND

1. Field of the Invention

The present invention relates to a debris filtering device of a nuclear fuel assembly, and more particularly, to a bottom spacer grid that can filter debris flowed through a channel of a lower end fitting with coolant from an upper portion of the lower end fitting of the nuclear fuel assembly, and prevent uplift of fuel rods due to coolant simultaneously.

2. Description of the Related Art

A nuclear reactor is a device in which nuclear chain reactions of nuclear fission materials are artificially controlled to achieve several purposes such as generating heat, producing radioisotopes and plutonium, or forming radiation fields.

Generally, a light water reactor uses uranium enriched to about 2~5% Uranium-235. The uranium is fabricated as a cylindrical pellet weighing about 5 g for to process as nuclear fuel used in a nuclear reactor. The pellets are bundled by hundreds together and inserted into a Zircaloy cladding tube in a vacuum, and an upper end cap is welded after insertion of spring and helium gas into the tube to manufacture a fuel rod. Finally, the fuel rod is burned through nuclear reaction in the nuclear reactor by forming a nuclear fuel assembly.

Figure 1:
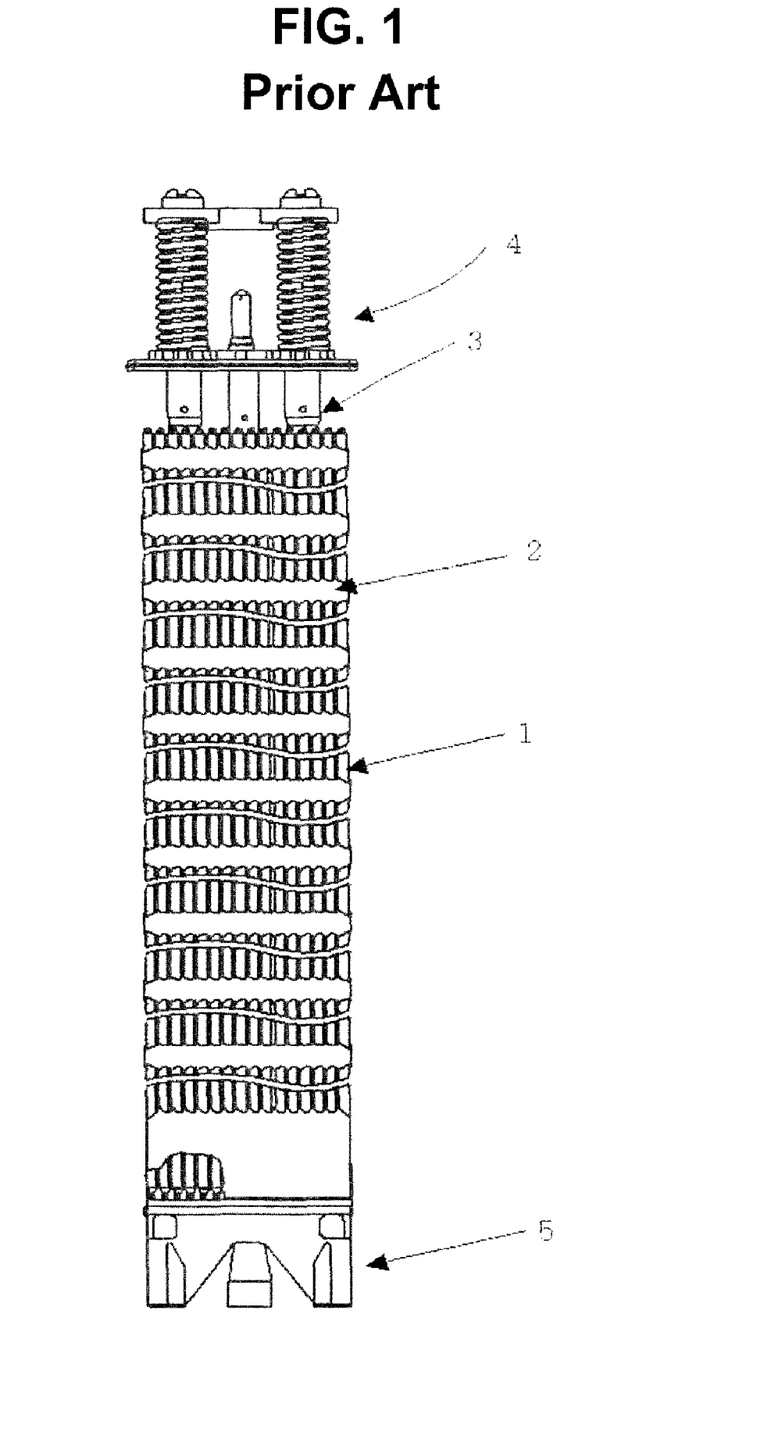
FIG. 1 is a schematic view illustrating a general nuclear fuel assembly.
Figure 2:
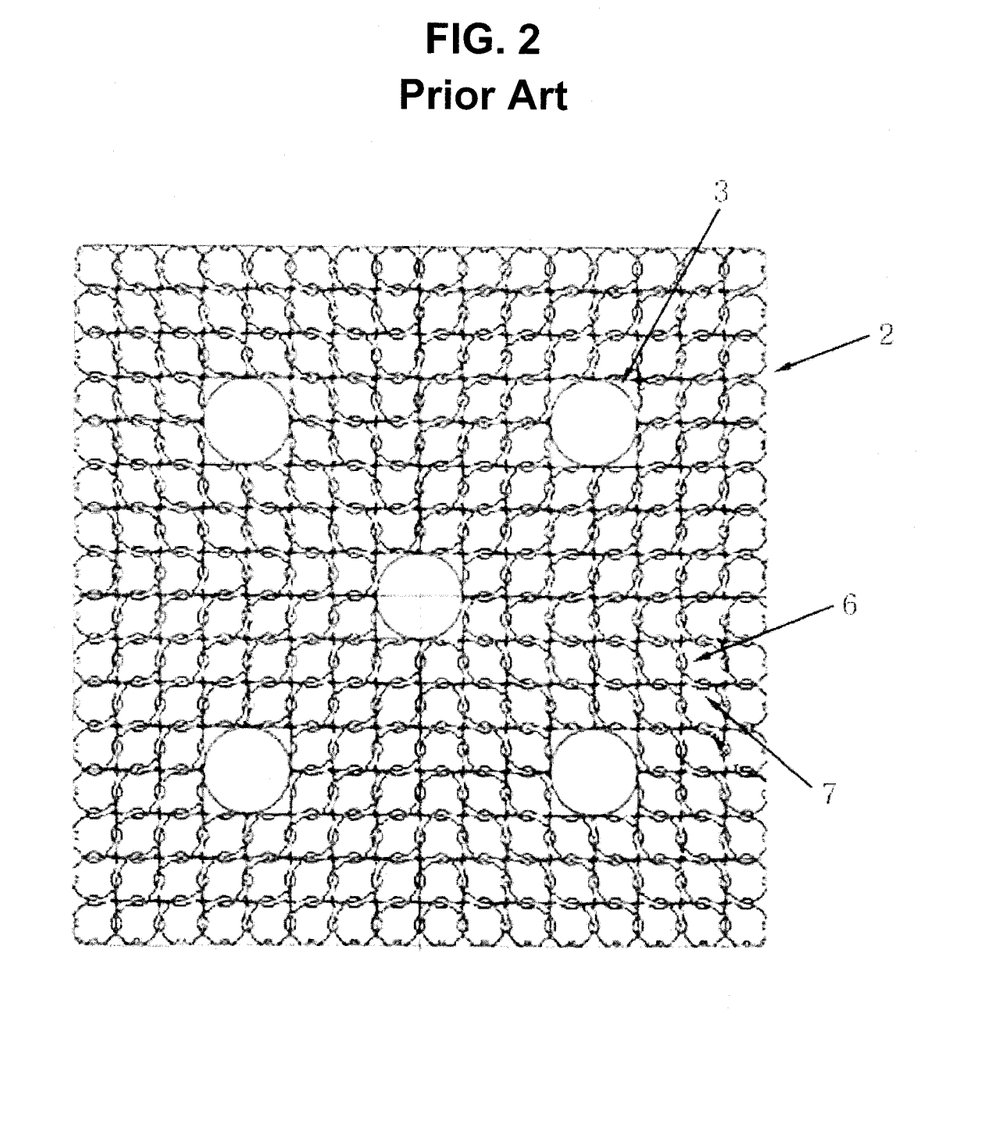
FIG. 2 is a plan view illustrating a general spacer grid.
Figure 3:
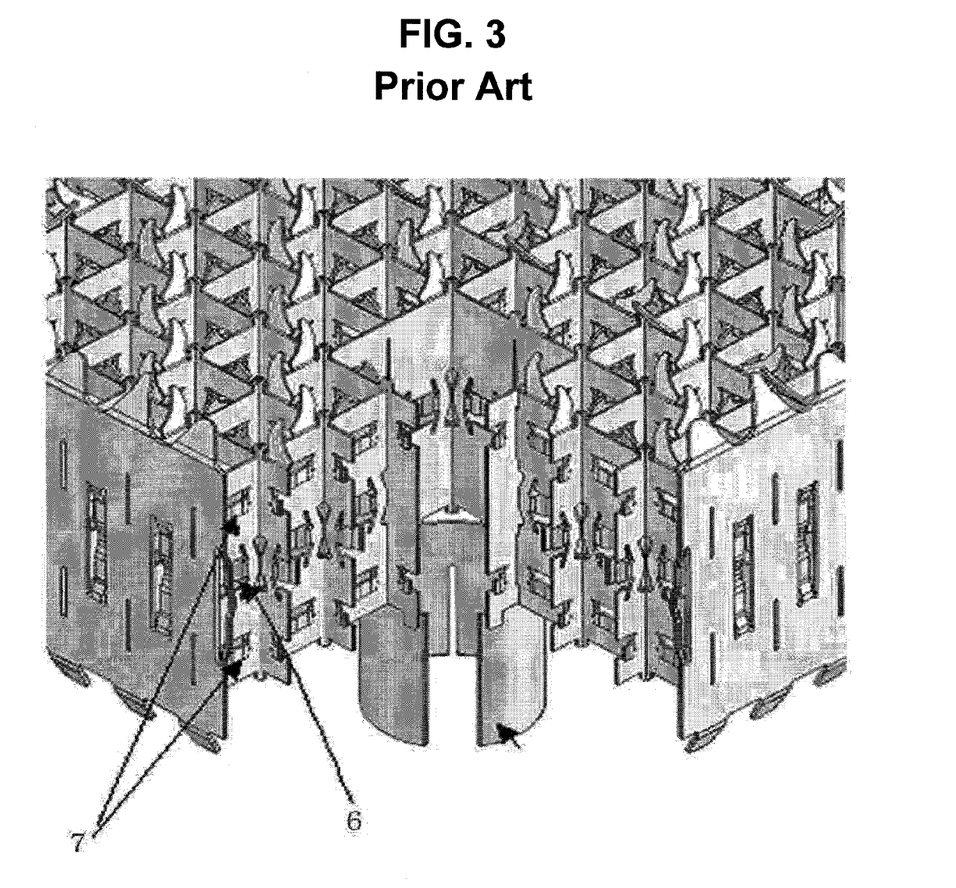
FIG. 3 is an exploded perspective view illustrating the general spacer grid.

The nuclear fuel assembly and their elements are shown in FIGS. 1 to 3.

FIG. 1 is a schematic diagram illustrating a general nuclear fuel assembly, FIG. 2 is a plan view illustrating a spacer grid seen from above, and FIG. 3 is an exploded perspective view illustrating the spacer grid in detail.

Referring to FIG. 1, the nuclear fuel assembly includes a body formed with an upper end fitting 4, a lower end fitting 5, a guide tube 3 and a spacer grid 2, and a fuel rod 1 supported by a spring 6 (see FIG. 3) and a dimple 7 (see FIG. 3) inserted and formed inside the spacer grid 2.

To prevent scratch on the surface of the fuel rod 3 and damage to the spring 6 inside the spacer grid in the event of assembling a fuel assembly, the surface of the fuel rod 1 is painted with lacquer and the fuel rod 1 is inserted into a skeletal structure, then, the upper and lower end fittings 4 and 5 are attached and fixed thereto, finally, the assembling of the nuclear fuel assembly is completed. Then, after the assembly, a manufacturing process of the assembly is completed by checking intervals between fuel rods, distortion, total length, size, etc., after removal of the lacquer from the completed assembly.

Referring to FIGS. 2 and 3, the spacer grid 2 is formed in a grid shape by mutually engaging slots (not shown) on which each strip (a thin metal plate) is formed at regular intervals to divide space portions for insertion of each of a plurality of fuel rods 1. The spacer grid 4 is arranged in number of 10 to 13 up and down and welded to the guide tube 3 having a length of 4 m. The spring 6 and the dimple 7 are regularly formed in each space portion that is divided by the spacer grid 2. The spring 6 and the dimple 7 are contacted to the fuel rod 1 (see FIG. 1) to maintain the interval of the fuel rods 1 (see FIG. 1), arrange the fuel rods 1 at determined positions and fix the fuel rod 1 due to elasticity of the spring 6.

The completed nuclear fuel assembly emits heat due to nuclear fission inside the nuclear reactor and the heat generated from the nuclear fuel assembly is absorbed by coolant. The coolant circulates the nuclear reactor and tubes of the nuclear reactor by means of a nuclear reactor cooling pump and promotes heat transfer from the nuclear fuel assembly to the coolant.

Various kinds of foreign materials flowed into the nuclear reactor with the coolant may be mixed in the coolant in a circulation process of the coolant, including debris and fragments such as metal particles, chips and shavings in manufacturing, installation and repair of piping and cooling equipment. Additionally, micro-vibration between the fuel rod and the spacer grid may be generated by passing the debris through channels of the lower end fitting and cladding tubes of the fuel rod may be damaged.

Moreover, when the fuel rod is lifted by rapid increase of coolant flux during abnormal conditions, the fuel rod may be bent or damaged. Due to nuclear and thermal hydraulic incompatibility of the nuclear fuel assembly, it affects integrity of nuclear fuel assembly.

Figure 4:
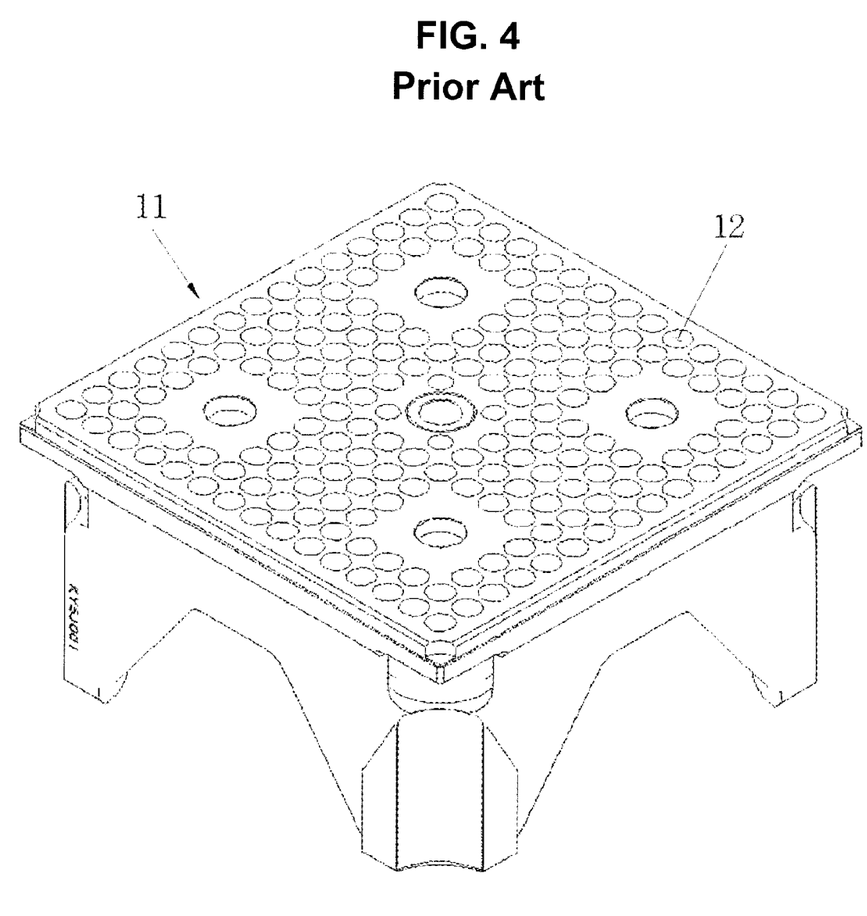
FIG. 4 is a perspective view illustrating a general lower end fitting.
Figure 5:
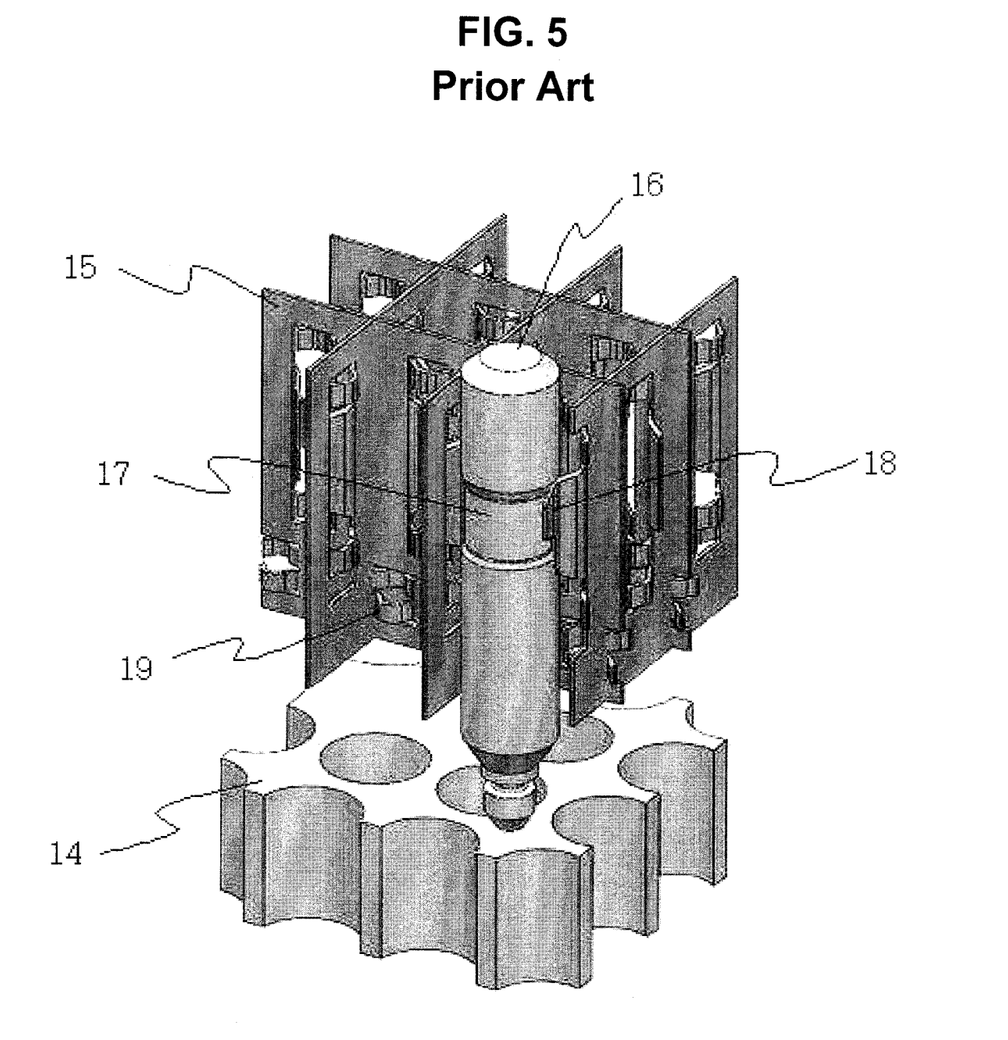
FIG. 5 is an exploded perspective view illustrating a conventional bottom spacer grid for debris filtering.

Methods for solving the above problems are a method for limiting a size of the channel 12 of the lower end fitting as shown in FIG. 4, a method for using a spacer grid for filtering debris (prior art 1) or a method for using a bottom spacer grid assembly for debris-filtering 15 (prior art 2) as shown in FIG. 5.

According to the prior art 1, it is comparatively simple and applicable, however, it promotes pressure drop due to decrease of channel size in comparison with improvement of debris filtering performance.

When coolant pressure drops, hydraulic uplift force increases. Thus, it needs higher pushing force of the spring of the upper end fitting. In addition, it accelerates fretting wear by increasing vibration of nuclear fuel rods or generating horizontal flow of coolant and it doesn't absorb heat from the fuel rods sufficiently.

Moreover, the bottom spacer grid enough to maintain spring force sufficiently must be mounted on the bottom of the nuclear fuel assembly to continuously fix fuel rods during combustion inside the reactor for preventing uplift of the fuel rod due to coolant.

In case of using the spacer grid assembly for debris filtering, it can reduce a size enough to pass debris by forming more complicated structures of dimples and arches to prevent inflow of debris or increasing a cross section. However, since the pressure drop of coolant is in proportion to cross section of the spacer grid assembly seen from an axial direction, thus it is possible to increase the cross-sectional size by making the structures of dimples and arches complicated unconditionally.

An example of using the debris filtering bottom spacer grid is U.S. Pat. No. 5,024,807, filed on Dec. 5, 1988, entitled "Debris Catching Spring Detent Spacer Grid" (prior art 2).

Referring to FIG. 5, the prior art 2 can support a fuel rod and prevent uplift of the fuel rod by inserting a cantilever spring 18 supporting an elongated bottom end cap 16 of the nuclear fuel rod in the lowest spacer grid 15 of nuclear fuel assemblies into a groove 17 of an outer circumferential surface of the bottom end cap 16. Additionally, the prior art 2 can prevent debris from being flowed into an effective section of the nuclear fuel assembly by protecting a debris filtering arch 19 from the fuel rods.

Moreover, debris is captured between the lower end fitting and the bottom spacer grid due to an interval from the lower end fitting 14.

However, the cantilever spring 18 of the prior art 2 reduces a necessary elastic section by restoring pushing volume of spring caused by an outer circumference of the elongated bottom end cap 16 at the depth of the groove 17, thus it can be restricted to obtain a desired spring characteristic. Additionally, the debris filtering arch 19 must be shaped with a thick strip plate enough to form a widely bent shape in a corner as illustrated in the view, and the pressure drop volume of the bottom spacer grid for debris filtering increases due to the thick plate.

SUMMARY

Accordingly, an object of the present invention is to provide a bottom spacer grid for debris filtering that can prevent uplift of fuel rods by forming a spring fixing outer surfaces of the fuel rods on a grid surface of the bottom spacer grid for debris filtering, forming at least one protruded louver on the spring, and protruding the louver at a height lower than a depth of a groove of a circumferential surface of a bottom end cap.

Another object of the present invention is to provide a bottom spacer grid for debris filtering that can minimize a diameter enough to pass debris and pressure drop caused by coolant by forming S-shaped debris filtering arches and protrusion plates inside grid cells of the bottom spacer grid.

Still another object of the present invention is to provide a bottom spacer grid for debris filtering that can make it easier cross engagement between vertical and horizontal strips by forming a slot for cross engagement between vertical and horizontal strips, and by forming a width of the strip slot in a section which the debris filtering arch is formed, to be wider than the thickness of the debris filtering arch in predetermined dimension.

Additional advantages, objects and features of the invention will be set forth in part in the description which follows and in part will become apparent to those having ordinary skill in the art upon examination of the following or may be learned from practice of the invention.

According to an aspect of the present invention, there is provided a bottom spacer grid for debris filtering with louvers for preventing uplift of fuel rods, in a spacer grid equipped with a strip dividing a plurality of unit grid cells and a plurality of springs, protruded to each of vertical and horizontal directions on the grid surface of the strip, having uniform elasticity and supporting a bottom end cap of a nuclear fuel rod, which includes: a spring having a plane portion with a predetermined size to contact to an outer circumference of the bottom end cap of the nuclear fuel rod; a louver protruded downward to the spacer grid at a predetermined angle from the plane portion of the spring; and a debris filtering member bent and protruded to the bottom of the grid surface of the spacer grid.

BRIEF DESCRIPTION OF THE DRAWINGS

The above and other objects, features and advantages of the present invention will be more apparent from the following detailed description taken in conjunction with the accompanying drawing, in which.

DETAILED DESCRIPTION OF EXEMPLARY EMBODIMENTS

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

Each space portion divided by a grid structure of a spacer grid is referred to as a unit grid cell and one surface inside the grid cell is referred to as a grid surface. If one grid surface is referred to as a vertical direction, all grid surfaces parallel thereto are referred to as vertical grid surfaces and grid surfaces perpendicular to the vertical grid surfaces are referred to as horizontal grid surfaces. Moreover, an axial direction denotes a direction to which a nuclear fuel rod is inserted, as a longitudinal direction of the unit grid cell.

FIGS. 6, 7 to 10 are views illustrating exemplary embodiments of the bottom spacer grid for debris filtering according to the present invention, which includes a plurality of strips 20 and 30, a spring 21, a louver 22, debris filtering arches 23 and 33, and protrusion plates 24 and 34.

The bottom spacer grid for debris filtering forms a grid space by crossing several vertical strips 20 and horizontal strips 30, a fuel rod is inserted into the grid space and a bottom end cap 40 of the fuel rod is positioned in the bottom spacer grid for debris filtering.

Figure 6:
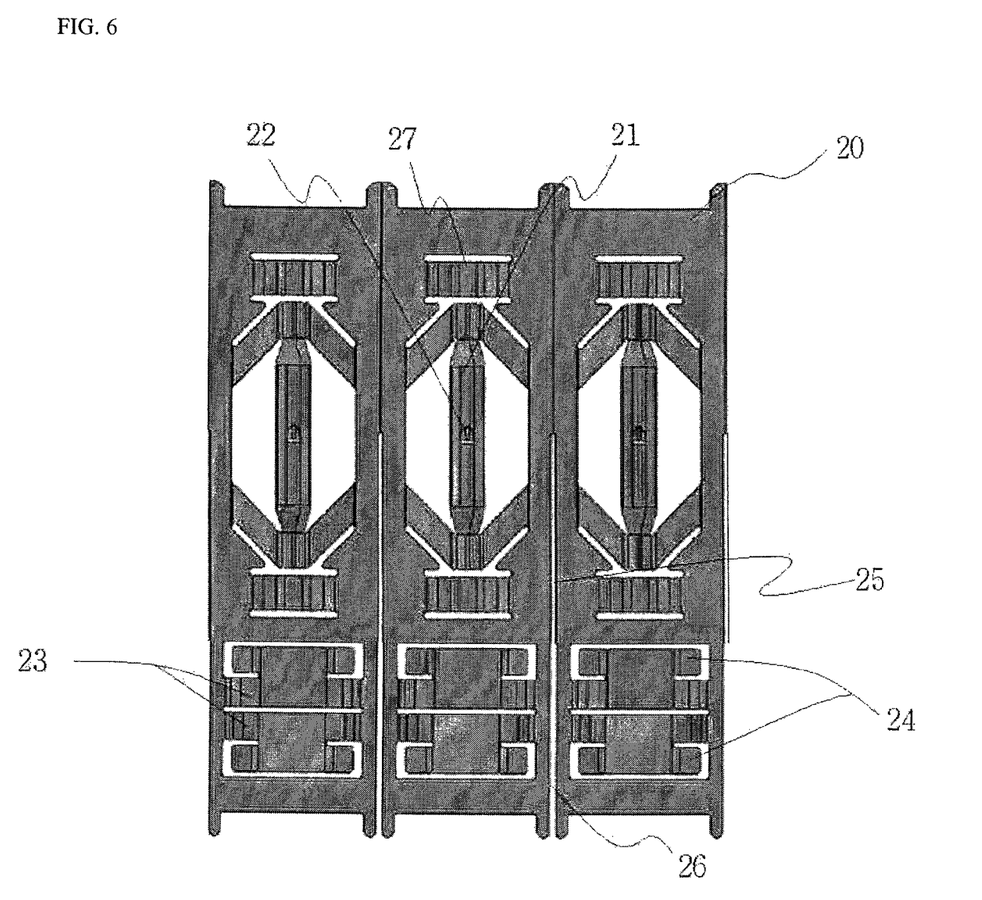
FIG. 6 is a front view illustrating a part of a vertical strip forming a bottom spacer grid for debris filtering according to the present invention.
Figure 7:
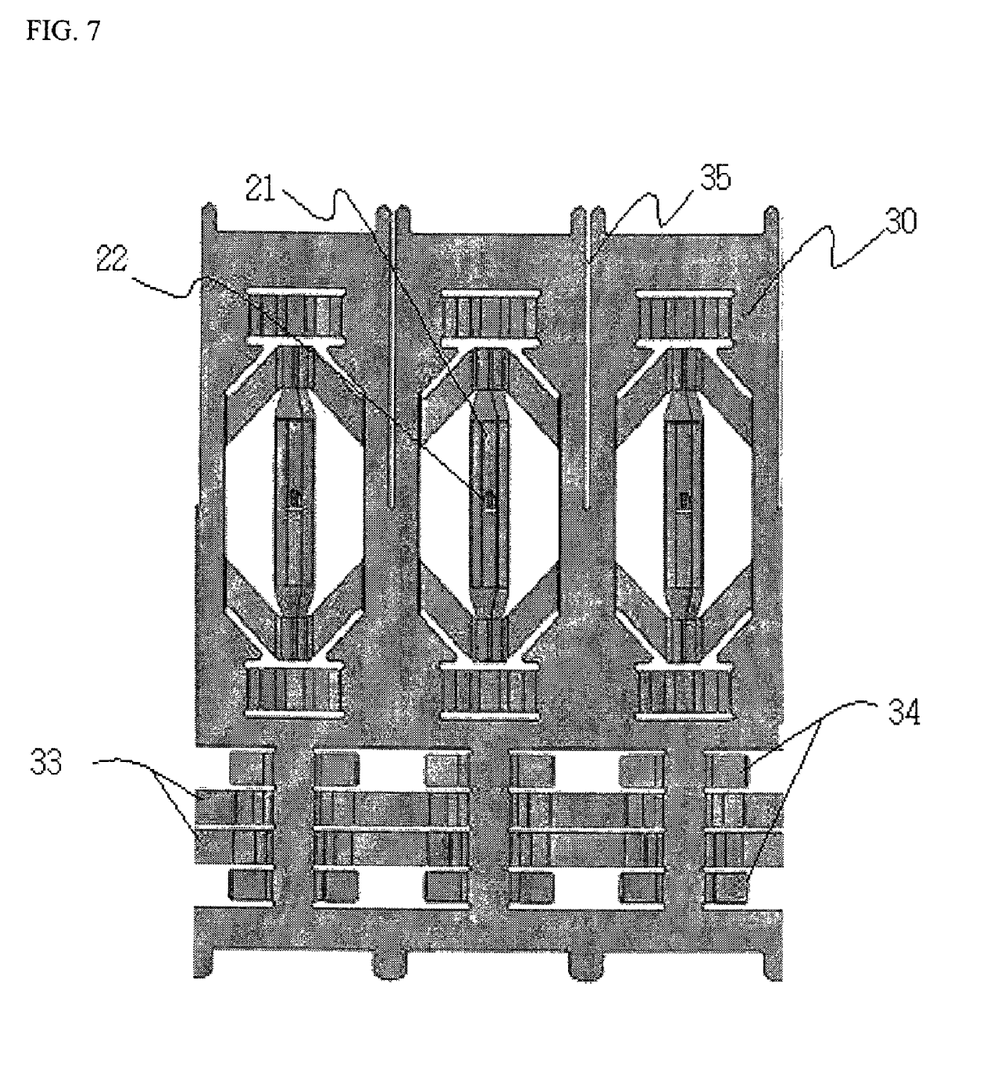
FIG. 7 is a front view illustrating a part of a horizontal strip forming the bottom spacer grid for debris filtering according to the present invention.
Figure 10:
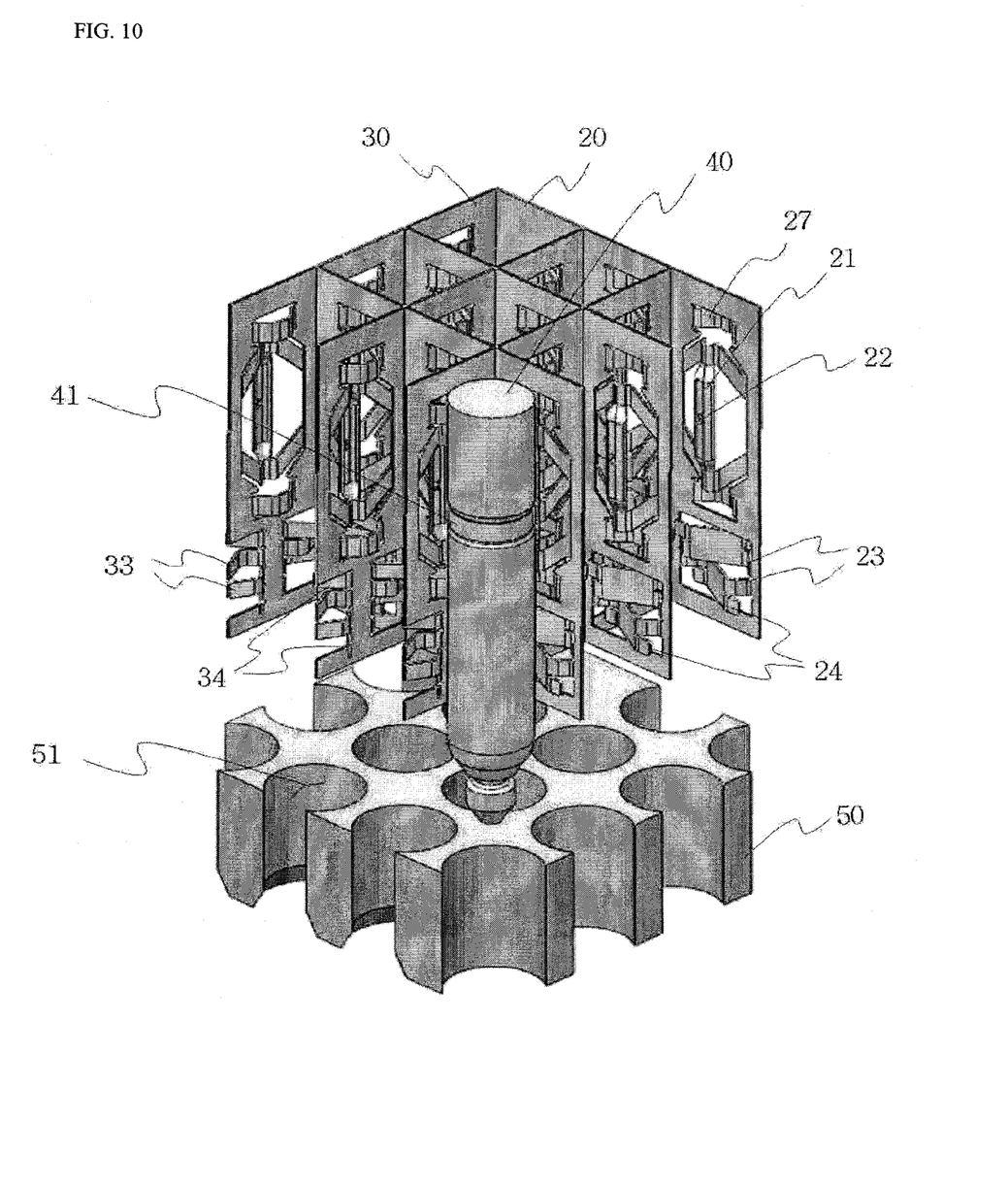
FIG. 10 is an exploded perspective view illustrating the bottom spacer grid for debris filtering according to the present invention.

Referring to FIGS. 6, 7 and 10, the vertical strip 20 and the horizontal strip 30 are explained below.

The vertical and horizontal strips 20 and 30 have several slots and slotted surfaces.

Referring to FIG. 6, it can be checked that the vertical strip 20 has a slot a 25 formed in a longitudinal direction from a lower portion of the strip to the center of the vertical strip 20.

Moreover, referring to FIG. 7, it can be checked that the horizontal strip 30 has a slot b 35 in a longitudinal direction from an upper portion of the strip to the center of the horizontal strip 30.

The slot a 25 of the vertical strip 20 is mutually connected to the slot b 35 of the horizontal strip 30, and a grid space is formed in the vertical and horizontal strips 20 and 30.

It can be checked that the slot a 25 formed in the vertical strip 20 has a different width in a regular section, and the reason will be described below.

The spring 21 on the strip, as shown in FIG. 6, is formed to have a regular length in a vertical direction and in the center thereof a plane portion is formed to be contacted to an outer circumference of the end cap of the fuel rod.

The fuel rod uplift-prevention louver 22 on the plane portion of the spring 21 is protruded to a fuel rod contact portion on the spring at a height lower than a depth of the groove 41 of a circumferential surface of the bottom end cap 40.

Likewise, the louver 22 is protruded at a height lower than the width of the groove 41 of the circumferential surface of the bottom end cap 40 to prevent an interference with a base in case of coupling with the bottom end cap.

Figure 9:
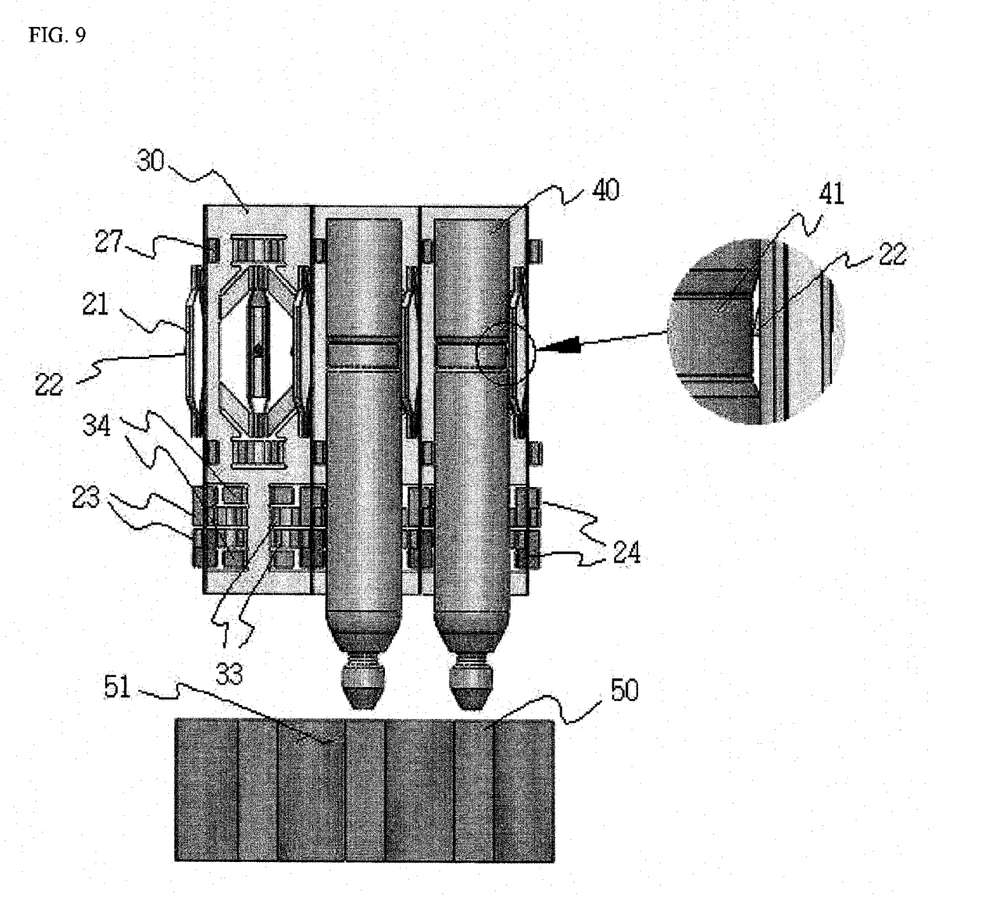
FIG. 9 is an exploded cross-sectional view illustrating the bottom spacer grid for debris filtering according to the present invention.

The louver 22, as shown in FIG. 9, is inserted into the bottom end cap uplift-prevention groove 41, and a fuel rod contact portion of the spring is formed to be contacted to an outer circumference of the bottom end cap.

The louver 22 has a sectional plane protruded from the spring plane portion, and the sectional plane is formed toward the bottom of the fuel rod to prevent uplift of the fuel rod inside the bottom end cap groove 41.

Figure 8:
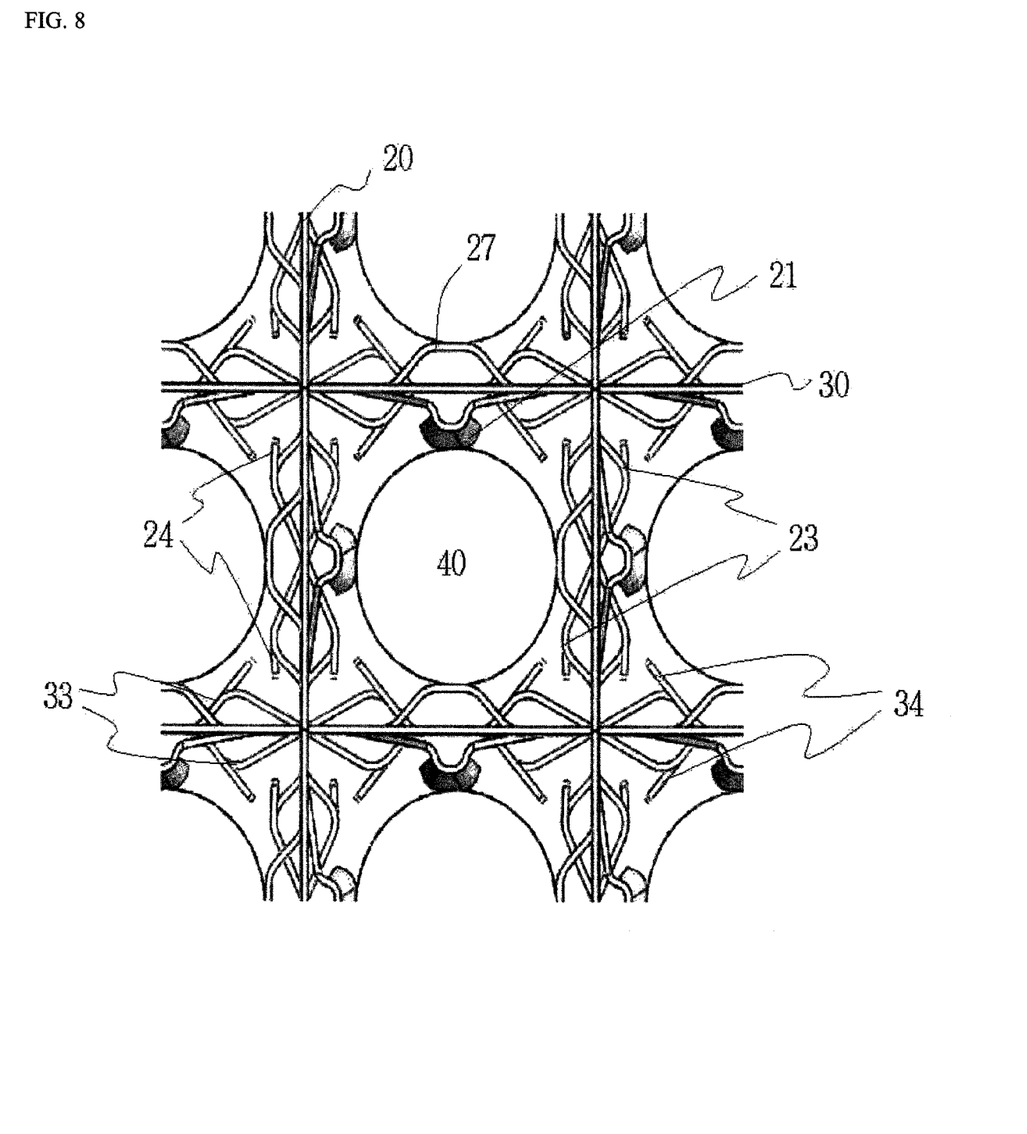
FIG. 8 is a plan view illustrating the bottom spacer grid for debris filtering according to the present invention.

Referring to FIGS. 6, 7 and 8, the debris filtering arches 23 and 33 and the protrusion plates 24 and 34 of the exemplary embodiment of the debris filtering member according to the present invention will be explained.

The debris filtering arch 23 of the vertical strip 20 and the debris filtering arch 33 of the horizontal strip 30 are formed at the same height to an axial direction, in case of intersectional connection between the vertical strip 20 and the horizontal strip 30.

Moreover, referring to FIG. 8, a pair of S-shaped arches are formed in a direction bent and protruded from the grid surface of the strip to the bottom end cap 30 in upper and lower portions of the axial direction.

The debris filtering arch 23 is formed in the lower portion of the bottom spacer grid, and a bent protrusion portion is formed from side to side around the center of the grid surface.

Directions of the right and left protrusion portions are countered to each other, the portions are protruded in an S-shaped arch on the plane view of the bottom spacer grid. In addition, the S-shaped arch is formed in pairs to be crossed to each other upward and downward.

The debris filtering arch b 33 is moved to a distance as much as half of a uniform grid space distance and formed axially at the same height as the distance to limit the maximum size of debris enough to be passed through a corner inside a cell.

The arch, as shown in FIG. 8, is bent in an S-shape, and the S-shaped arches 23 and 33 on the strip protruded in the corner inside the cell are positioned at the same height to a flow direction.

It can be checked that the slot a 25 formed on the vertical strip 20 has a different width in a regular section, and the vertical and horizontal strips 20 and 30 are connected to be crossed to each other to make the debris filtering arch 33 to easily pass in a horizontal direction.

Referring to FIG. 6, the protrusion plate a 24 of the vertical strip 20 is formed as a cantilever short protruded plate to minimize the maximum diameter enough to pass debris in the corner inside the cell in upper and lower portions of the debris filtering arch a 23.

The protrusion plate b 34 of the horizontal strip 30, as shown in FIG. 7, is formed as a cantilever protruded plate that is comparatively longer than the protrusion plate a 24 to achieve the same purpose in the upper and lower portions of the debris filtering arch b 33.

In addition, the dimple 27 is formed in the same configuration as the conventionally noticed before and the detail explanation will be omitted.

Hereinafter, the operation employed by the exemplary embodiment will be explained.

As explained above, the bottom spacer grid for debris filtering supports the outer circumference by a pair of springs 21 when the bottom end cap 40 of the nuclear fuel rod and prevents uplift of the fuel rod due to rapid increase of coolant flux in an abnormal condition when the uplift-prevention louver is inserted into the groove 41 of the circumferential surface of the bottom end cap.

In this time, the louver 22 is equipped with a sectional plane protruded from the spring plane portion, and formed not to be separated from the groove 41 of the circumferential surface of the bottom end cap. In addition, the louver 22 is formed to prevent an interference with a base of the groove of the circumferential surface of the bottom end cap to protect the contact to the outer circumference of the fuel rod of the spring 21.

In addition, the spring 21 supports the outer circumference of the fuel rod and can obtain a desired characteristic of the spring without loss of a necessary elastic section with shaping of thin strips.

In each unit grid cell of the spacer grid the two springs 21 and four dimples 27 are formed, and the movement of the fuel rod is limited due to contact to the fuel rod in the whole six positions.

The debris filtering shape formed in the bottom of the spring 21 is formed at the same height to the axial direction in each corner of the grid space and arranged to limit a size of debris enough to pass through the channel hole 51 of the lower end fitting 50.

Moreover, plates protruded to the debris filtering arches 23 and 33 are formed to minimize a diameter enough to pass debris, and a space between the lower end fitting 50 and the bottom spacer grid for debris filtering is formed to easily catch debris.

As described above, the debris filtering bottom spacer grid with louvers for preventing fuel rods from being uplifted according to the present invention produces the following effects.

First, it can prevent uplift of fuel rods by forming a spring that fix outer surfaces of the fuel rods on a grid surface of the bottom spacer grid for debris filtering, forming at least one protruded louver on the spring, and protruding the louver at a height lower than a depth of a groove of a circumferential surface of a bottom end cap on portions contacted to the fuel rods.

Second, it can minimize a diameter enough to pass debris and pressure drop caused by coolant by forming S-shaped debris filtering arches and protrusion planes inside the grid cell of the bottom spacer grid.

Third, it can make it easier intersectional connection between vertical and horizontal strips by forming a slot for the intersectional connection between vertical and horizontal strips, and by forming a width of a strip slot of a section which the debris filtering arch is formed to be wider than the thickness of the debris filtering arch in predetermined dimension.

Fourth, it can minimize pressure drop caused by coolant by forming the S-shaped debris filtering arches and protrusion plates inside the grid cell of the bottom spacer grid, thereby shaping a strip at a thickness lower than that of the strip used for forming a curved debris filtering arch in a corner of a conventional bottom spacer grid.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A nuclear fuel assembly comprising:
   a plurality of fuel rods, each of the plurality of fuel rods having a bottom end cap which has an uplift prevention groove formed on an outer circumference of the bottom end cap; and
   a bottom spacer grid which filters debris and prevents the plurality of fuel rods from being uplifted,
   wherein the bottom spacer gird comprises:
      strips dividing an inner space of the bottom spacer grid into a plurality of unit grid cells,
      a plurality of springs protruding from the strips to hold the plurality of fuel rods, and
      a debris filtering member bent and protruding at a lower portion of the bottom spacer grid,
      wherein each of the plurality of springs comprises:
         a plane portion formed with a predetermined size and contacting to the outer circumference of the bottom end cap, the plane portion supporting the plurality of fuel rods with an elasticity, and
         a louver having a sectional plane protruded with a predetermined angle from the plane portion toward a lower portion of the bottom spacer grid, wherein the louver is located in the uplift prevention groove and has a height lower than a depth of the uplift prevention groove of the bottom end cap to avoid an interference with a bottom surface of the uplift prevention groove when the plane portion is contacted with the outer circumference of the bottom end cap.

2. The nuclear fuel assembly of claim 1, wherein the debris filtering member has protrusions bent left and right from a bottom center of a region of the strips forming one of the plurality of unit grid cells and bottom corners of said one of the plurality of unit grid cells, such that the protrusions have an S-shaped arch on a plane of the bottom spacer grid, and a pair of debris filtering members are formed in an S-shape.

3. The nuclear fuel assembly of claim 2, wherein a cantilever protrusion plate is formed on the strips at a predetermined angle to the S-shaped arch that is the debris filtering member to minimize the maximum size of debris passing through the filter.

4. The nuclear fuel assembly of claim 1, wherein the strips comprises:
   a plurality of vertical strips having first slots formed at a lower portion of the plurality of vertical strips in a longitudinal direction of the plurality of fuel rods; and
   a plurality of horizontal strips having second slots formed at an upper portion of the horizontal strips in a longitudinal direction of the plurality of fuel rods,
   wherein the plurality of vertical strips and the plurality of horizontal strips are arranged to cross each other to form the plurality of unit grid cells,
   wherein a length of the first slots are longer than a length of the second slot,
   wherein a width of the second slots and a width of an upper region of the first slots are smaller than a width of a lower portion of the first slots but wider than a thickness of the strips,
   wherein the width of the lower portion of the first slots are wider than a thickness of the debris filtering member.

5. The nuclear fuel assembly of claim 2, wherein the strips comprises:
   a plurality of vertical strips having first slots formed at a lower portion of the plurality of vertical strips in a longitudinal direction of the plurality of fuel rods; and
   a plurality of horizontal strips having second slots formed at an upper portion of the horizontal strips in a longitudinal direction of the plurality of fuel rods,
   wherein the plurality of vertical strips and the plurality of horizontal strips are arranged to cross each other to form the plurality of unit grid cells,
   wherein a length of the first slots are longer than a length of the second slot,
   wherein a width of the second slots and a width of an upper region of the first slots are smaller than a width of a lower portion of the first slots but wider than a thickness of the strips,
   wherein the width of the lower portion of the first slots are wider than a thickness of the debris filtering member.

* * * * *